(12) United States Patent
Hiraide

(10) Patent No.: US 10,281,727 B2
(45) Date of Patent: May 7, 2019

(54) VIRTUAL IMAGE DISPLAY DEVICE

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 386 days.

(21) Appl. No.: 15/010,911

(22) Filed: Jan. 29, 2016

(65) Prior Publication Data
US 2016/0187660 A1    Jun. 30, 2016

Related U.S. Application Data

(63) Continuation of application No. 14/174,138, filed on Feb. 6, 2014, now Pat. No. 9,279,985.

(30) Foreign Application Priority Data

Feb. 19, 2013    (JP) .................................. 2013-029732

(51) Int. Cl.
*G06F 1/00*    (2006.01)
*G02B 27/01*    (2006.01)
*G02B 1/04*    (2006.01)

(52) U.S. Cl.
CPC ......... *G02B 27/0176* (2013.01); *G02B 1/045* (2013.01); *G02B 27/0172* (2013.01);
(Continued)

(58) Field of Classification Search
CPC ............. G09G 5/00; G02C 1/00; G02C 11/00
See application file for complete search history.

(56) References Cited

U.S. PATENT DOCUMENTS 6,384,983 B1    5/2002  Yamazaki et al.
8,038,292 B2 *  10/2011 Matsumoto ........ G02B 27/0176
                                                         351/121
(Continued)

FOREIGN PATENT DOCUMENTS

JP    2003-066365 A    3/2003
JP    2004-185023 A    7/2004
(Continued)

OTHER PUBLICATIONS

Jul. 30, 2015 Office Action issued in U.S. Appl No. 14/174,138.
Oct. 28, 2015 Office Action issued in U.S. Appl. No. 14/174,138.

*Primary Examiner* — Michael A Faragalla
(74) *Attorney, Agent, or Firm* — Oliff PLC

(57) ABSTRACT

A limiting part limits displacement of an optical member partially fixed to a frame unit, and excessive stress applied on the optical member and deformation of the optical member may be prevented. That is, support strength of the optical member may be improved by supplementarily using the limiting part. Note that the optical member is partially fixed to the frame unit, and fastening parts and the number of parts are reduced and downsizing becomes easier and reduction in weight of the virtual image display device is easier. Further, the optical member is partially fixed to the frame unit, and thus, even when there is a difference in coefficient of thermal expansion between the optical member and the frame unit, the expansion or the like of the optical member with respect to the frame unit is allowed and distortion, deformation, breakage of the optical member may be prevented more reliably.

12 Claims, 10 Drawing Sheets

(52) U.S. Cl.
CPC .. *G02B 2027/013* (2013.01); *G02B 2027/015* (2013.01); *G02B 2027/0161* (2013.01); *G02B 2027/0169* (2013.01); *G02B 2027/0178* (2013.01); *G02B 2027/0198* (2013.01)

(56) References Cited

U.S. PATENT DOCUMENTS

| | | |
|---|---|---|
| 8,472,120 B2 | 6/2013 | Border et al. |
| 9,075,249 B2 * | 7/2015 | Heinrich ................ G02C 11/10 |
| 2003/0048550 A1 | 3/2003 | Atsumi et al. |
| 2010/0157433 A1 | 6/2010 | Mukawa et al. |
| 2010/0321409 A1 * | 12/2010 | Komori ................ G02B 27/017 |
| | | 345/656 |

FOREIGN PATENT DOCUMENTS

| | | |
|---|---|---|
| JP | 2010-026193 A | 2/2010 |
| JP | 2010-145859 A | 7/2010 |
| JP | 2011-002753 A | 1/2011 |

\* cited by examiner

VIRTUAL IMAGE DISPLAY DEVICE

This application is a continuation application of U.S. patent application Ser. No. 14/174,138 filed Feb. 6, 2014, which claims priority to Japanese Patent Application No. 2013-029732 filed Feb. 19, 2013, the entire contents of which are incorporated herein by reference.

BACKGROUND

1. Technical Field

The present invention relates to a virtual image display device that presents an image as a virtual image to an observer, and specifically to a virtual image display device preferable for a head-mounted display worn on a head of the observer.

2. Related Art

Various systems have been proposed as optical systems incorporated in virtual image display devices such as a head-mounted display (hereinafter, also referred to as HMD) worn on a head of an observer (for example, see Patent Document 1 (JP-A-2011-2753), Patent Document 2 (JP-A-2010-145859), or the like).

Regarding the virtual image display device including HMD, reduction in size and weight and achievement of a wider angle of view without deterioration of image quality are desired. If the entire field of view of the observer is covered and only image light is seen, the observer does not grasp the outside world condition and feels uneasy. The outside world and the image are superimposed and seen, and thereby, new application such as virtual reality is created. Accordingly, a display that superimposes and displays image light without hindering the vision of the outside world is desired. Further, for improvement of the feel when being worn by the observer and better physical appearance, it is generally desirable to make the form closer to spectacles.

In consideration of the above described situation, for example, it is conceivable that a virtual image display device includes a light guide part provided in front of the observer's eye to see through, and the see-through type light guide part guides image light from an image display element to the eye of the observer. In this type of virtual image display device, it is necessary to support the light guide part in front of the eye of the observer, and, for example, a pair of image display units each including an image light generator and a light guide plate are fixed to a coupling member and the coupling member is fixed to the back of a frame similar to a spectacle frame (see Patent Document 1).

However, in the virtual image display device disclosed in Patent Document 1 or the like, the coupling member is provided separately from the frame to support the image display unit and the structure becomes complicated, the weight increases if the support strength for the image display unit by the coupling member is increased, and, if the weight of the coupling member or the like is reduced, the support strength of the image display unit is liable to be lower.

SUMMARY

An advantage of some aspects of the invention is to provide a virtual image display device that may improve support strength of a unit part for image display while reduction in weight is realized by a simple structure.

An aspect of the invention is directed to a virtual image display device including an image element, an optical member that directs a light from the image element toward an eye of an observer for visual recognition of an image, and a frame unit that supports the image element and the optical member so that the optical member may be placed in front of the eye of the observer, wherein the frame unit has a limiting part that mechanically limits displacement of the optical member partially fixed to the frame unit.

In the virtual image display device, the limiting part limits the displacement of the optical member partially fixed to the frame unit, and excessive stress applied on the optical member and deformation of the optical member may be prevented. That is, support strength of the optical member may be improved by supplementarily using the limiting part. Note that the optical member is partially fixed to the frame unit, and fastening parts and the number of parts are reduced and downsizing becomes easier and reduction in weight of the virtual image display device may be easier. Further, the optical member is partially fixed to the frame unit, and thus, even when there is a difference in coefficient of thermal expansion between the optical member and the frame unit, the expansion or the like of the optical member with respect to the frame unit is allowed and distortion, deformation, breakage of the optical member may be prevented more reliably.

In a specific aspect of the invention, in the virtual image display device, the limiting part is placed adjacent to the optical member in a position to which the optical member is displaced and blocks the displacement of the optical member. In this case, the limiting part occupies the adjacent space of the optical member and the displacement of the optical member is limited.

In another specific aspect of the invention, the optical member has an oval outline, and the limiting part has a protrusion part that limits the displacement in a direction perpendicular to a surface in which the optical member extends while allowing the displacement in a longitudinal direction of the optical member. Here, the oval outline includes a figure like a trajectory formed by linear movement of an ellipse or a circle etc. In this case, deflection and distortion of the optical member are suppressed while expansion and contraction with respect to the longitudinal direction of the optical member are allowed.

In another specific aspect of the invention, the frame unit is formed using a metal material and the optical member is formed using a resin material. In this case, high accuracy and high stiffness may be provided to the frame unit, and reliability of assembly of the image element and the optical member may be improved. Further, the degree of freedom of the shape of the optical member may be improved while the weight thereof is reduced.

In yet another specific aspect of the invention, the limiting part is in elastic contact with the optical member. In this case, damage on the optical member may be prevented by the limiting part.

In yet another specific aspect of the invention, the optical member has a lock part locked by the limiting part. Here, "locked by the limiting part" means that "engaged with the limiting part and mechanically stopped", and is not limited to fit of concave and convex portions but widely includes various means such as connection by a fastener, provision of one or more projections for blocking movement, and a guide that limits movement with respect to a specific direction. In this case, compared to the case where the main body is directly locked, the displacement of the optical member may be reliably limited by the limiting part and influence that deteriorates the optical performance of the optical member may be suppressed.

In yet another specific aspect of the invention, the lock part is locked by the limiting part using engagement of a concave portion and a convex portion. Here, the engagement of the concave portion and the convex portion is not limited to fit in close contact between the concave portion and the convex portion, but includes the case where movement over a certain limit is limited while the concave portion and the convex portion are apart from each other.

In yet another specific aspect of the invention, the lock part has a rib linearly extending along a peripheral part of the optical member, and the limiting part has a groove that is provided to be sandwiched by a pair of the protrusion parts and receives the rib. In this case, the peripheral part of the optical member may be locked over a relatively wide range by the limiting part, and the displacement of the optical member may be limited more reliably.

In yet another specific aspect of the invention, the limiting part further has an elastic member provided in a gap between the rib and the concave portion. In this case, the optical member may be protected by the elastic member as a buffer material while clearance is provided by the gap.

In yet another specific aspect of the invention, the frame unit has a fixing part that is connected to a part of the optical member to fix the optical member to the frame unit. In this case, the optical member is connected to the fixing part via an attachment part and fixed to the frame unit.

In yet another specific aspect of the invention, the fixing part and the limiting part are provided apart from each other. In this case, excessive stress applied on the fixing part etc. may be suppressed.

In yet another specific aspect of the invention, the frame unit has a frame with the fixing part and a protector that is fixed to the frame and protects at least a part of the peripheral part of the optical member. In this case, the optical member may be protected to be surrounded by the frame and the protector, and durability to a high impact from a random direction like that when the virtual image display device is dropped may be improved.

In yet another specific aspect of the invention, the limiting part is provided at a center side along the frame and the fixing part that fixes the optical member to the frame unit is provided at a side of the frame.

In yet another specific aspect of the invention, the optical member has a prism-like light guide part that guides an image light from an image display element as the image element to the eye of the observer while reflecting the light inside. In this case, an intermediate image is formed within the light guide part and the image is observed, and thereby, the degree of freedom of the placement of the image display element etc. may be improved while upsizing of the image display element etc. is avoided.

In yet another specific aspect of the invention, the light guide part has a prism that enables see-through observation of an outside world light while guiding the image light and a light-transmissive member that is connected to the prism and assists a see-through function of the outside world light. In this case, the light guide part may be formed in a shape similar to that of a lens part of spectacles, and the field of view may be made better and the degree of freedom of the appearance may be improved.

In yet another specific aspect of the invention, the image element outputs a signal light for two-dimensional scanning and the optical member reflects the light from the image display element and guides the light to the eye of the observer.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, the first embodiment of a virtual image display device according to the invention will be explained in detail with reference to FIG. 1 etc.

Figure 1:
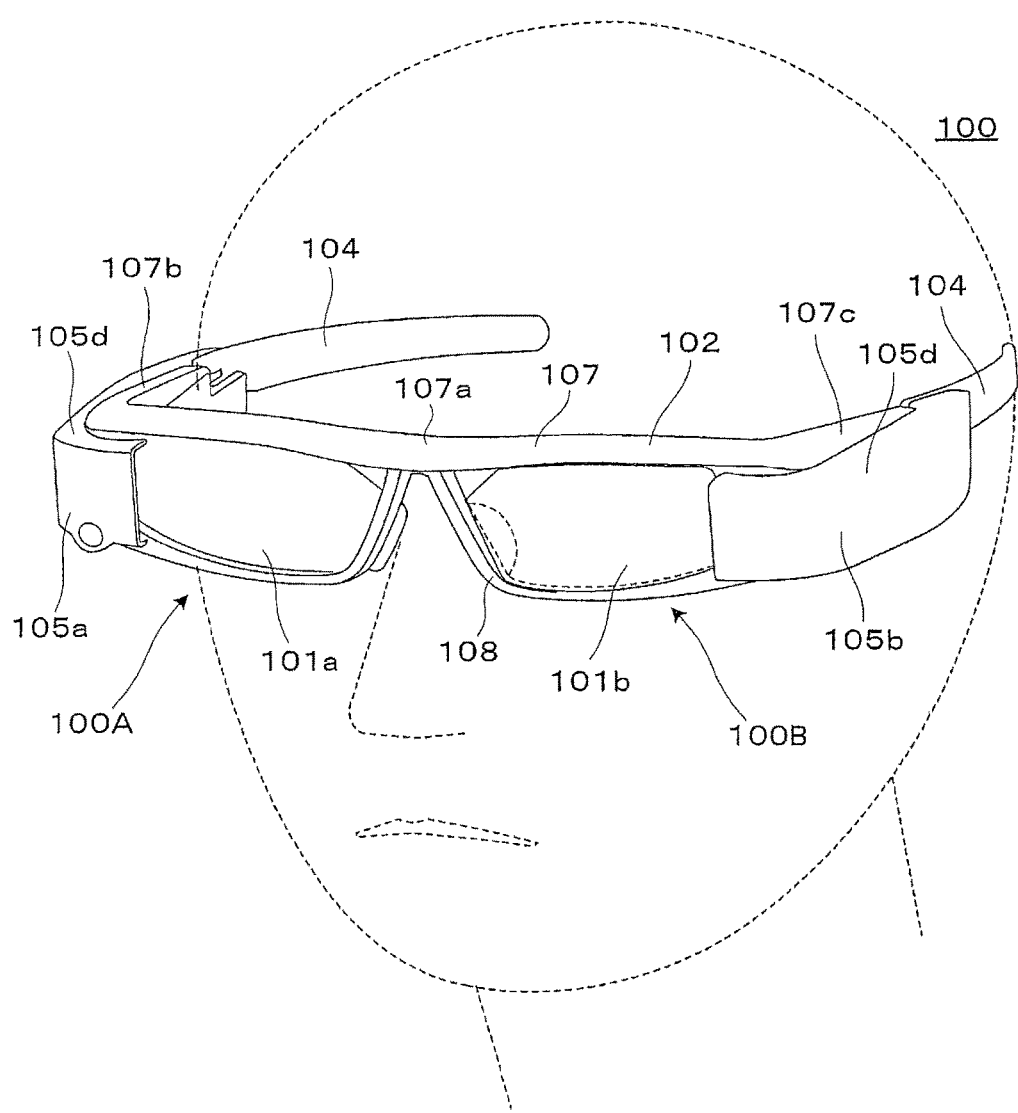
FIG. 1 is a perspective view for explanation of an appearance of a virtual image display device as a first embodiment of the invention.

As shown in FIG. 1, a virtual image display device 100 of the embodiment is a head-mounted display having an appearance like spectacles, and enables an observer or a user wearing the virtual image display device 100 to visually recognize image light by a virtual image and enables the observer to see through to visually recognize or observe an outside world image. The virtual image display device 100 includes first and second optical members 101a, 101b that cover the front of the observer's eyes for seeing through, a frame unit 102 that supports both of the optical members 101a, 101b, and first and second image forming main body parts 105a, 105b attached to parts from both ends on the right and left of the frame unit 102 to temple parts 104 at the rear sides. Here, a first display unit 100A with a combination of the first optical member 101a and the first image forming main body part 105a on the left side in the drawing is a section for forming a virtual image for right eye and the single unit functions as a virtual image display device. Further, a second display unit 100B with a combination of the second optical member 101b and the second image forming main body part 105b on the right side in the drawing is a section for forming a virtual image for left eye and the single unit functions as a virtual image display device.

Figure 2A:
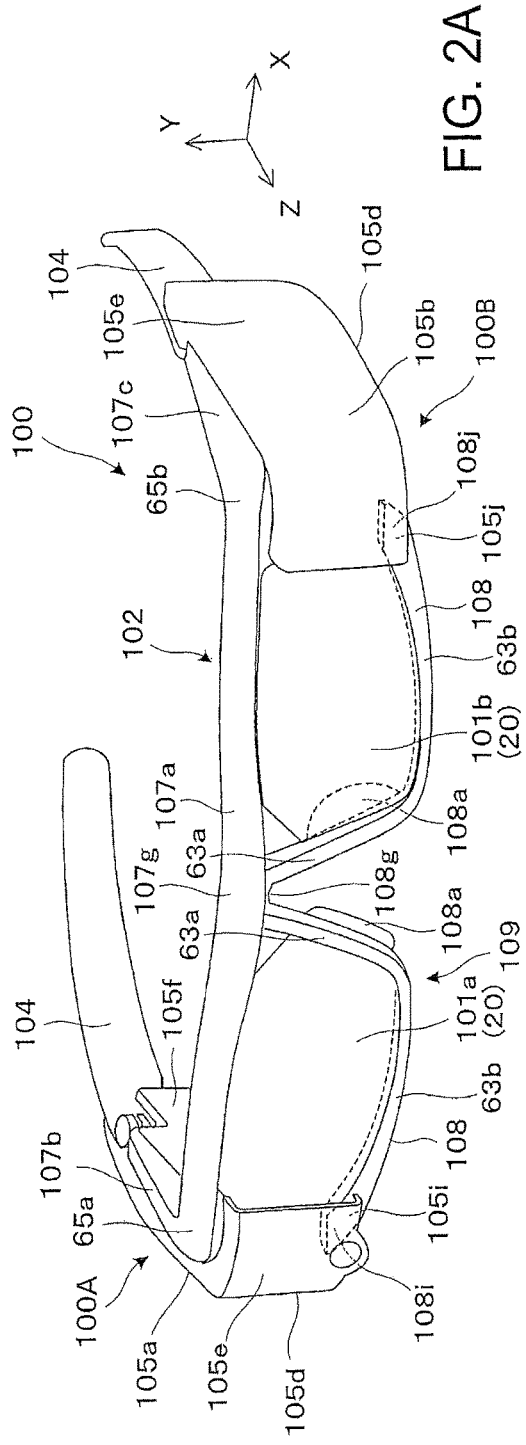
FIG. 2A is a perspective view showing an overall appearance of the virtual image display device.
Figure 2B:
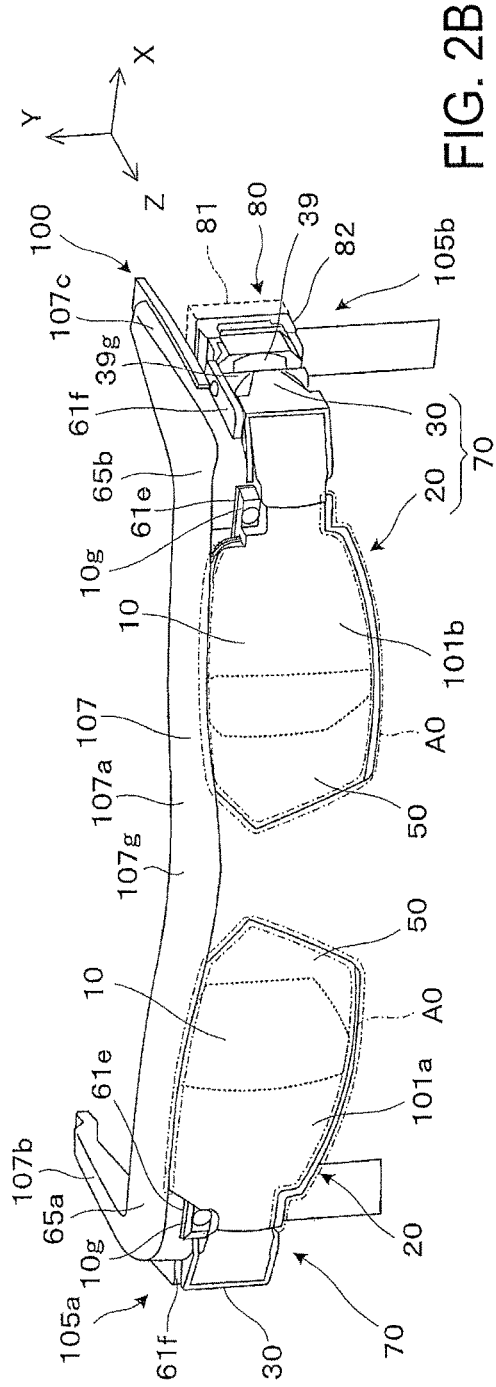
FIG. 2B is a perspective view showing an internal structure when an exterior member and a protector are removed from the virtual image display device.
Figure 3:
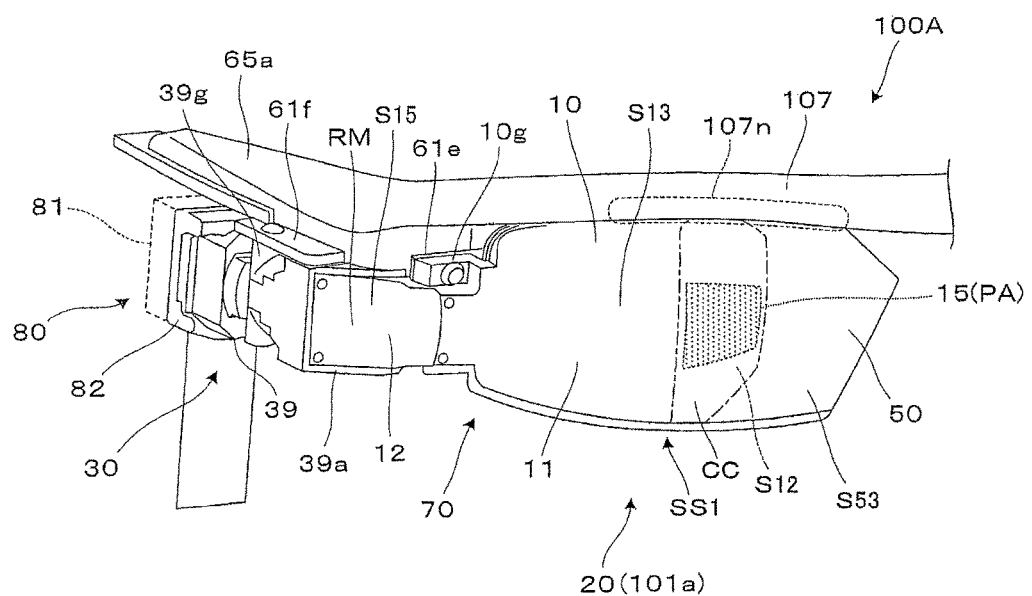
FIG. 3 is a perspective view showing a state when the exterior member etc. are removed for explanation of a structure of a first display unit of the virtual image display device.

FIGS. 2A and 2B are diagrams for comparison between an exterior and an interior of the virtual image display device 100, and FIG. 2A shows an overall appearance of the virtual image display device 100 and FIG. 2B shows an internal structure of the virtual image display device 100. Note that FIG. 3 is a perspective view corresponding to the left half of FIG. 2B in which the first display unit 100A side of the virtual image display device 100 is partially enlarged.

As shown in the drawings, the frame unit 102 provided in the virtual image display device 100 includes a frame 107 placed on the upside and protectors 108 placed on the downside. Of the frame unit 102, the frame 107 on the upside is an elongated plate-like member bent in a U-shape, and includes a front part 107a extending in lateral directions (X-directions) and a pair of side parts 107b, 107c extending in depth directions (Z-directions). The frame 107, i.e., the front part 107a and the side parts 107b, 107c are a metal integrated component formed by aluminum die-cast and other various metal materials. The width in the depth directions (Z-directions) of the front part 107a is sufficiently thicker than the thickness or the width of light guide parts 20 corresponding to the first and second optical members 101a, 101b. At the left side of the frame 107, specifically, in a side end part 65a as a part from the left end to the side part 107b in the drawing in the front part 107a, the first optical member 101a and the first image forming main body part 105a are aligned and directly fixed by screws to be supported. Further, at the right side of the frame 107, specifically, in a side end part 65b as a part from the right end to the side part 107c in the drawing in the front part 107a, the second optical member 101b and the second image forming main body part 105b are aligned and directly fixed by screws to be supported. Note that the first optical member 101a and the first image forming main body part 105a are aligned with each other by fit and the second optical member 101b and the second image forming main body part 105b are aligned with each other by fit.

The protectors 108 are members having under rim shapes and fixed to the frame 107. A center part 108g of the protectors 108 is fixed to a center part 107g of the frame 107 by fit and screws. The protector 108 is an elongated plate-like member bent like a two-step crank, and an integrated component formed using a metal material or a resin material. The width in the depth directions (Z-directions) of the protector 108 is nearly equal to the thickness or the width of the light guide part 20. A first end portion 108i of the protector 108 is fixed to the first image forming main body part 105a by fit and a second end portion 108j of the protector 108 is fixed to the second image forming main body part 105b by fit. More specifically, the first end portion 108i of the protector 108 is fitted in a recessed part 105i provided in an outer member 105e of an external member 105d having a cover shape that covers the first image forming main body part 105a for fixing. The second end portion 108j of the protector 108 is fitted in a recessed part 105j provided in an outer member 105e of an external member 105d having a cover shape that covers the second image forming main body part 105b for fixing.

The frame 107 has a role not only in supporting the first and second image forming main body parts 105a, 105b but also in protecting the interiors of the first and second image forming main body parts 105a, 105b in cooperation with the external members 105d. The protectors 108 have a role in protecting the first and second optical members 101a, 101b connected to the first and second image forming main body parts 105a, 105b or the side edge portions and the lower edge portions of the light guide parts 20. Specifically, longitudinal parts 63a of the protectors 108 protect the inner side edge portions near the nose of the peripheral parts A0 of the light guide parts 20 from surrounding various objects present under the usage environment, and lateral parts 63b of the protectors 108 protect the under lower edge portions of the peripheral parts A0 of the light guide parts 20 from surrounding various objects present under the usage environment. That is, when the frame 107 and the protectors 108 have sufficient strength, even in the case of a collision of the virtual image display device 100 with the other surrounding objects or the like, the possibility of damage and displacement in the first and second image forming main body parts 105a, 105b and the first and second optical members 101a, 101b, particularly in the exposed light guide parts 20 may be reduced.

Nose contact members 108a having pad shapes are respectively formed in the pair of longitudinal parts 63a near the center part 108g of the protectors 108. The longitudinal parts 63a and the lateral parts 63b of the protectors 108 are apart from or in loose contact with the peripheral parts A0 having oval shapes of the light guide parts 20 except the base sides connected to the first and second image forming main body parts 105a, 105b. Note that the peripheral parts A0 of the light guide parts 20 are also apart from or in loose contact with the front part 107a of the frame 107. As described above, the first and second optical members 101a, 101b or the light guide parts 20 are in close contact with the frame 107 and the protectors 108 in the C-shaped peripheral parts A0 except the base sides, but not fixed to the frame 107 or the protectors 108. Accordingly, even when there is a difference in coefficient of thermal expansion between the center light guide parts 20 and the frame unit 102 including the frame 107 and the protectors 108, the expansion of the light guide parts 20 within the frame unit 102 is allowed, and distortion, deformation, breakage of the light guide parts 20 may be prevented.

As shown in FIG. 3, the first display unit 100A includes a projection see-through device 70 as an optical system for projection, and an image display device 80 that forms image light in a different point of view. The projection see-through device 70 has a role in projecting an image formed by the first image forming main body part 105a as a virtual image on the eye of the observer. The projection see-through device 70 includes a light guide and see-through prism 10, a see-through light-transmissive member 50, and an imaging projection lens 30.

Figure 4A:
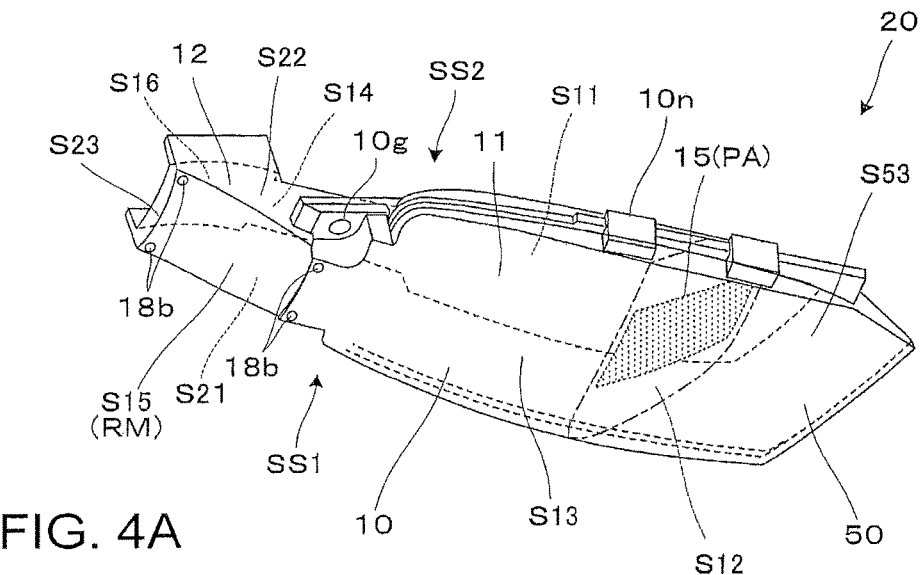
FIGS. 4A and 4B are perspective views for explanation of appearances of a light guide part or an optical member incorporated in the first display unit.
Figure 4B:
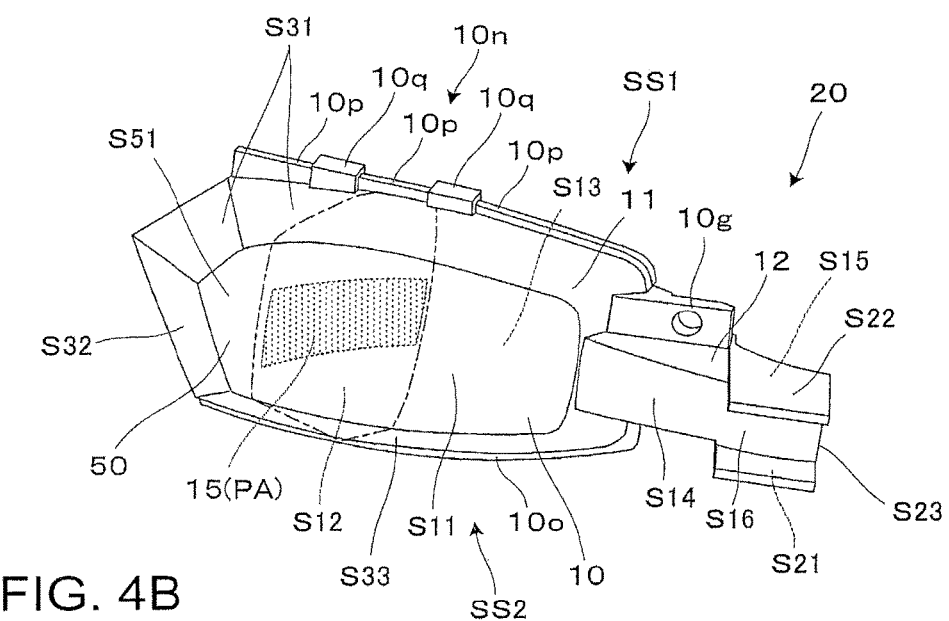

As shown in FIGS. 4A and 4B, the prism 10 and the light-transmissive member 50 are fixed to each other to form the integrated light guide part 20. The light guide part 20 is a prism-like member that guides image light to the eye of the observer while reflecting the light inside. The main body part surrounded by the peripheral part A0 of the light guide part 20 has an oval outline. Here, the light-transmissive member 50 is provided to be connected to the end side of the prism 10, i.e., a first prism part 11 at the output side or the light-exiting side in the extension direction thereof, and fixed to the first prism part 11 by bonding using an adhesive agent. The light guide part 20 with a combination of the prism 10 and the light-transmissive member 50 of the projection see-through device 70 corresponds to the first optical member 101a in FIG. 1, and the projection lens 30 of the projection see-through device 70 and the image display device 80 that forms an image pattern for display correspond to the first image forming main body part 105a in FIG. 1. A first rib 10n is formed on the upper edge side near the frame 107 of the peripheral part A0 of the light guide part (optical member) 20, and a second rib 10o is formed on the lower edge side near the protector 108. The first rib 10n on the upper edge side has a structure in which a plurality of rib portions (convex portions) 10p and a plurality of wide portions (convex portions) 10q are alternately connected and linearly extends long and thin along the edge of the light guide part 20 as a whole. Of them, the former rib portions (convex portions) 10p are provided in association with the first prism part 11 and the light-transmissive member 50 and enables alignment of these members or the like. The latter wide portions (convex portions) 10q are portions corresponding to gates of a die for injection molding of the first prism part 11 and the light-transmissive member 50. The wide portions 10q are not limited to the gates, but may be transferred and molded in special shapes with respect to the first prism part 11 and the light-transmissive member 50. Though the details will be described later, the first rib portions 10n are lock parts locked by limiting parts 107n provided on the frame 107, and displacement with respect to the depth directions (X-directions) of the light guide part 20 is limited by the existence of the first rib (lock parts) 10n.

Figure 5A:
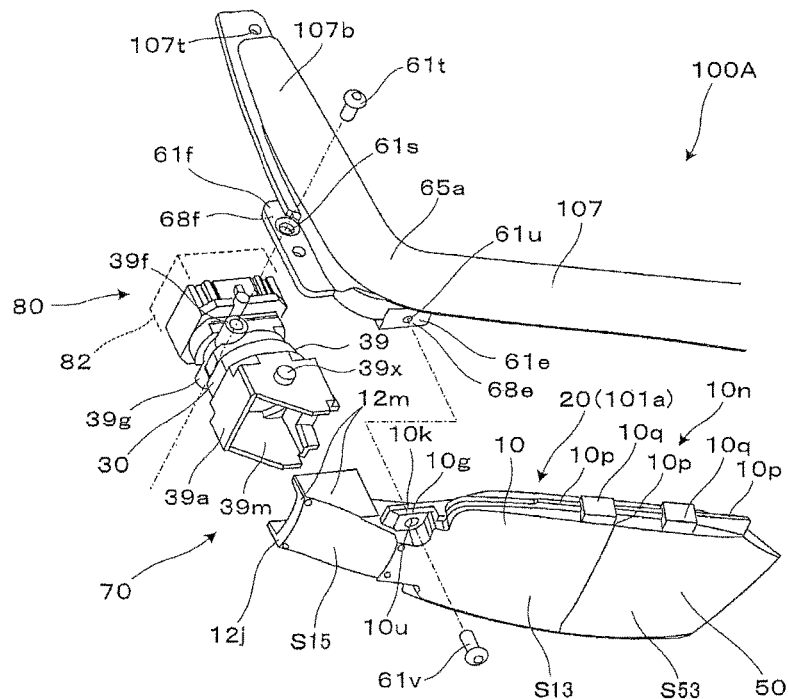
FIGS. 5A and 5B are exploded perspective views for explanation of a method of fixing a prism and a projection lens to a frame of the virtual image display device.
Figure 5B:
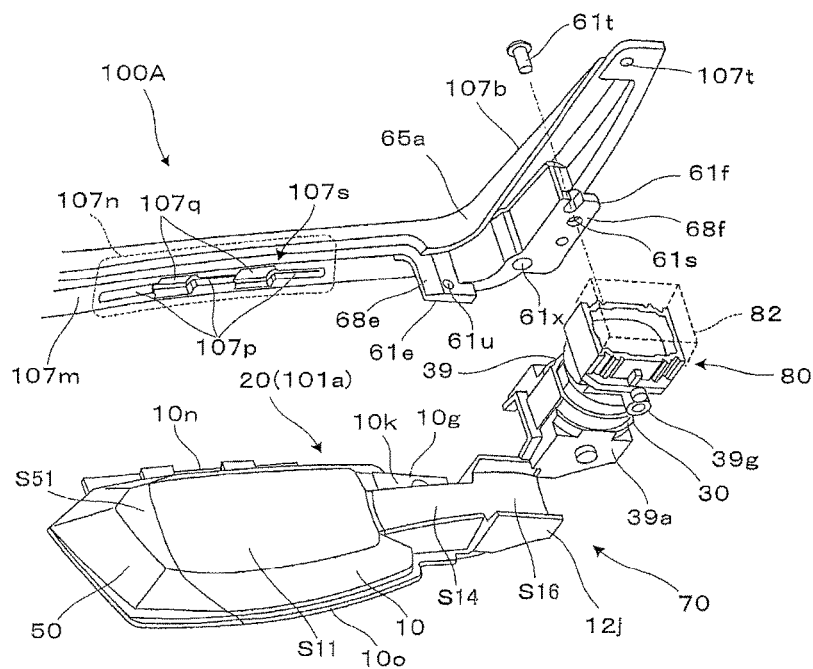

Referring to FIGS. 5A and 5B etc., assembly of the first display unit 100A to the frame 107 will be explained. The projection lens 30 forming the first image forming main body part 105a is directly fixed to a first fixing part 61f provided in the side end part 65a of the frame 107 using an attachment part 39g formed to be buried in a lens tube 39 thereof. At the fixation, a rear surface 68f of the first fixing part 61f and an upper end surface 39f of the attachment part 39g or the like are brought into contact and alignment is achieved, and a screw 61t is threaded into the attachment part 39g via a screw hole 61s and detachable and reliable fixation is achieved. Concurrently, a boss 39x provided on the lens tube 39 is fitted into a boss hole 61x of the frame 107 and the rotation of the lens tube 39 is regulated, and positioning with respect to the rotation is performed. On the other hand, the light guide part 20 as the first optical members 101a is directly fixed to a second fixing part 61e provided on the side end part 65a of the frame 107 using a projecting attachment part 10g formed in the neck part thereof. The attachment part 10g is stood to circumferentially expand in the part at the entrance side or the light-incident side of the light guide part 20, specifically, around the boundary between the first prism part 11 and a second prism part 12. At the fixation, an abut surface 68e provided in the front part of the second fixing part 61e and a rear surface 10k of the attachment part 10g are brought into contact and alignment is achieved, and a screw 61v is threaded into a screw hole 10u via the screw hole 61u and detachable and reliable fixation is achieved. Note that the image display device 80 shown in FIGS. 5A and 5B etc. is fixed to be fitted into the rear end of the lens tube 39 of the projection lens 30.

The light guide part 20 is positioned with respect to the projection lens 30 and locked with an end part 12j at the second prism part 12 side of the prism 10 fitted into a locking member 39a having a rectangular frame shape provided and opening at the front end side of the lens tube 39 of the projection lens 30. That is, when the prism 10 provided in the light guide part 20 is fixed to the second fixing part 61e of the frame 107, the end part 12j at the second prism part 12 side is inserted to be fitted into the locking member 39a of the lens tube 39. Concurrently, a side surface 12m of the end part 12j is brought into contact with an inner surface 39m of the locking member 39a and alignment is achieved.

Figure 6A:
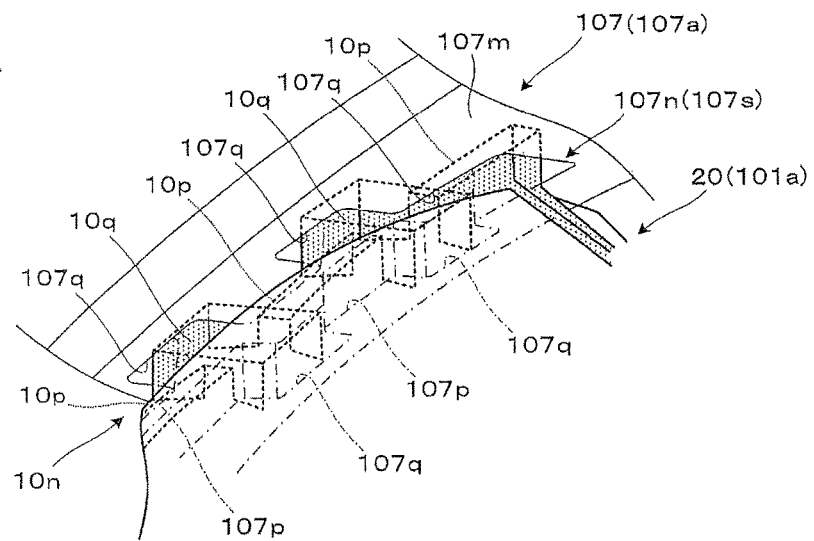
FIG. 6A is a partially enlarged perspective view for explanation of a limiting part.
Figure 6B:
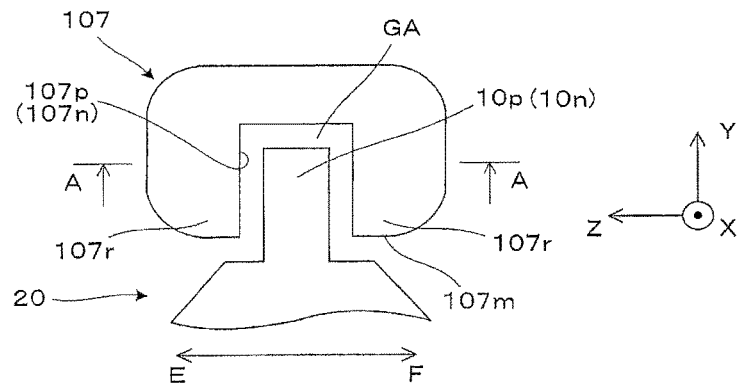
FIG. 6B is a partially enlarged sectional view for explanation of the limiting part.
Figure 6C:
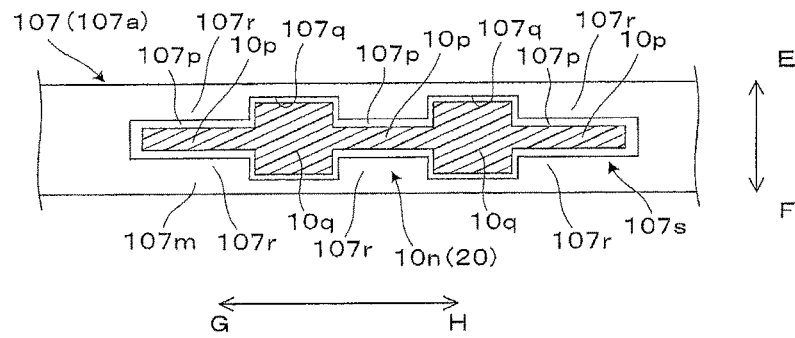
FIG. 6C is a sectional view of the limiting part as seen in a direction of arrows AA shown in 6B.

As shown in FIG. 5B, the limiting part 107n having a groove shape is provided as a stopper at the center side appropriately apart from the second fixing part 61e in a lower surface 107m of the front part 107a of the frame 107. The limiting part 107n has a pair of protrusion parts 107r extending along the front part 107a of the frame 107, and has a groove 107s provided to be sandwiched by the protrusion parts 107r and extending along the front part 107a. The groove 107s has a structure in which a plurality of groove portions (concave portions) 107p and a plurality of wide portions (concave portions) 107q are alternately connected. After the assembly of the first optical member 101a or the light guide part 20, the projecting rib 10n provided in the upper end part of the light guide part 20 is inserted into the limiting part 107n in a loose-fit condition having a slight gap. Thereby, the rib (lock part) 10n is received by the groove 107s and locked in the limiting part 107n including the pair of protrusion parts 107r sandwiching the groove 107s using engagement of the concave portions and the convex portions. Concurrently, as shown in FIGS. 6A and 6C, the respective rib portions 10p of the rib 10n are inserted into the respective groove portions 107p of the limiting part 107n, and the respective wide portions 10q of the rib 10n are inserted into the respective wide portions 107q of the limiting part 107n. Further, as shown in FIGS. 6B and 6C, a sufficient gap GA exists between the groove portions (concave portions) 107p of the limiting part 107n and the rib portions (convex portions) 10p of the rib 10n. The sufficient gap GA also exists between the wide portions 107q of the limiting part 107n and the wide portions 10q of the rib 10n. As a result, displacement at the end side of the first optical member 101a or the light guide part 20 may be limited with respect to the depth directions EF of the frame 107 (the directions perpendicular to the surface in which the light guide part 20 extends and corresponding to the Z-directions shown FIG. 2B). That is, the end of the light guide part (optical member) 20 is displaced to some degree, and excessive stress applied on the light guide part 20 and deformation of the light guide part 20 to the non-recoverable degree may be prevented. On the other hand, the rib 10n of the light guide part 20 and the limiting part 107n of the frame 107 extend in the lateral directions GH (X-directions), the gap GA exists with respect to the depth directions EF and the lateral directions GH between the rib 10n and the inner wall of the groove 107s of the limiting part 107n, and thereby, the non-fixed state of the light guide part 20 to the frame 107 is secured. As described above, the engagement of the rib 10n by the limiting part 107n is only with respect to the lateral directions GH (X-directions), and the locking of the rib 10n with the limiting part 107n is only with respect to the lateral directions GH (X-directions). Note that the light guide part 20 is slightly apart from the protector 108 in a non-fixed state in the relation with the protector 108. Thereby, even when there is a difference in coefficient of thermal expansion between the light guide part 20 and the frame 107, the expansion or the like of the light guide part 20 with respect to the frame 107 is allowed.

Figure 7A:
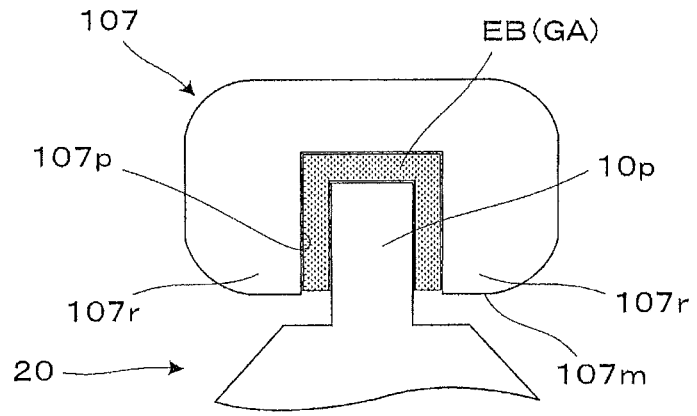
FIGS. 7A and 7B correspond to FIGS. 6A and 6B for explanation of a modified example of the limiting part.
Figure 7B:
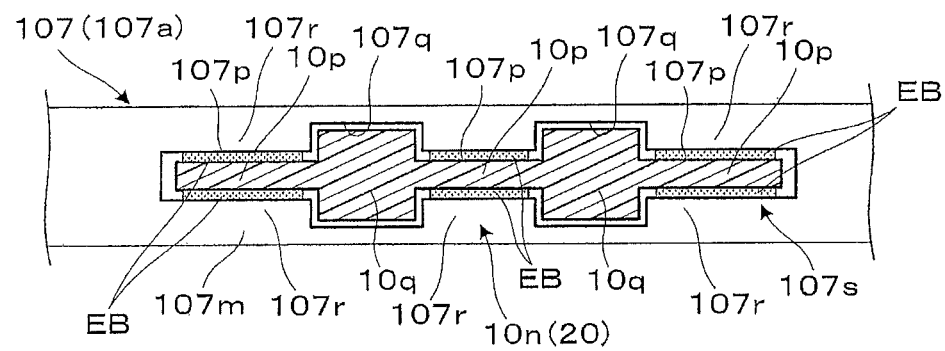

FIGS. 7A and 7B show a modified example of the limiting part 107n shown in FIGS. 6A and 6B etc. The limiting part 107n has an elastic member EB of elastomer such as rubber, a silicon resin, or the like. The part as the gap GA between the groove 107s of the limiting part 107n and the rib 10n corresponding to the rib 10n is filled with the elastic member EB. Thereby, the end of the light guide part (optical member) 20 is displaced little. On the other hand, the limiting part 107n and the rib 10n are not completely fixed, but in elastic contact. That is, the limiting part 107n and the rib 10n are only elastically connected by the elastic member EB, and expansion, contraction, or the like of the light guide part 20 with respect to the frame 107 is allowed.

At the above described steps, an assembly of the frame 107 and the projection see-through device 70 (see FIG. 2B) may be obtained.

Referring to FIGS. 2A and 2B, the assembly of the external member 105d to the frame 107 will be explained. First, the outer members 105e of the external members 105d are fixed to the assembly of the frame 107 and the projection see-through devices 70. The outer members 105e are fixed by fit with the frame 107 and the projection lenses 30, fastening of the screws to the attachment parts 39g of the projection lenses 30, or the like. In this regard, the end portions 108i, 108j of the protectors 108 that have been already fixed to the frame 107 are fitted and fixed in the recessed parts 105i, 105j formed in the outer members 105e. Then, inner members 105f are fitted in the outer members 105e and fixed to the outer members 105e by screws. Thereby, the projection lens 30 forming the first image forming main body part 105a, the first image forming main body part 105a, etc. and the projection see-through device 70 and the side parts 107b, 107c of the frame 107 are housed within the spaces sandwiched between the inner members 105f and the outer members 105e.

Returning to FIG. 2A etc., the temple parts 104 are fixed to the holes 107t formed on the ends of the pair of side parts 107b, 107c provided in the frame 107. The connection parts of the temple parts 104 and the side parts 107b, 107c may have hinge structures, and the temple parts 104 may be folded in this case.

Note that the second display unit 100B shown in FIG. 1 has the same structure as that of the first display unit 100A and is formed only by symmetric reversal of the first display unit 100A, and the explanation of the structure, the function, the assembly, etc. of the second display unit 100B will be omitted.

Figure 8:
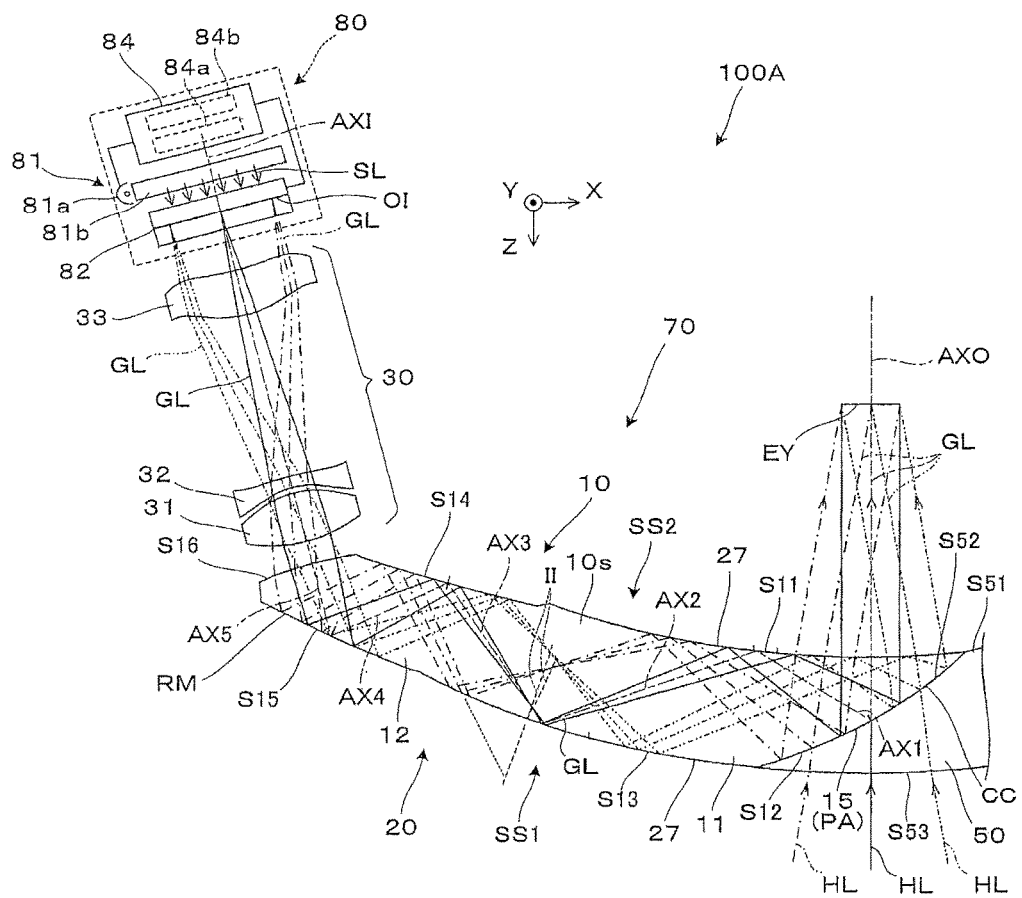
FIG. 8 is a sectional view in a symmetry plane with respect to the upper and lower parts of the first display unit forming the virtual image display device.

Referring to FIG. 8, the details including functions and operations of the projection see-through device 70 etc. will be explained. Of the projection see-through device 70, the prism 10 as a part of the light guide part 20 is an arc-shaped member curved along the facial surface in the plan view. Of the prism 10, the first prism part 11 is provided at the center side near the nose, i.e., the light-exiting side and has a first surface S11, a second surface S12, a third surface S13 as side surfaces having optical functions, and the second prism part 12 is provided at the peripheral side far from the nose, i.e., the light-incident side and has a fourth surface S14, a fifth surface S15, a sixth surface S16 as side surfaces having optical functions. Among them, the first surface S11 and the fourth surface S14 are adjacent, the third surface S13 and the fifth surface S15 are adjacent, and the second surface S12 is placed between the first surface S11 and the third surface S13 and the sixth surface S16 is placed between the fourth surface S14 and the fifth surface S15.

In the prism 10, the first surface S11 is a free-form surface around an output side optical axis AXO in parallel to the Z-axis as the center axis, the second surface S12 is a free-form surface around an optical axis AX1 contained in the reference surface (the illustrated section) in parallel to the XZ-plane and inclined with respect to the Z-axis as the center axis, and the third surface S13 is a free-form surface around the output side optical axis AXO as the center axis. The fourth surface S14 is a free-form surface around a bisector of a pair of optical axes AX3, AX4 contained in the reference surface in parallel to the XZ-plane and inclined with respect to the Z-axis as the center axis, the fifth surface S15 is a free-form surface around a bisector of a pair of optical axes AX4, AX5 contained in the reference surface in parallel to the XZ-plane and inclined with respect to the Z-axis as the center axis, and the sixth surface S16 is a free-form surface around the optical axis AX5 contained in the reference surface in parallel to the XZ-plane and inclined with respect to the Z-axis as the center axis. Note that the first to sixth surfaces S11 to S16 have symmetric shapes with respect to the vertical (or longitudinal) Y-axis direction with the reference surface (the illustrated section) horizontally (or laterally) extending in parallel to the XZ-plane through which the optical axes AX1 to AX 5 etc. pass.

Of the prism 10, a prism main body 10s is formed using a resin material that exhibits high light transmissivity in a visible range, and molded by injection and solidification of a thermoplastic resin in a die, for example. Note that, as the material of the prism main body 10s, for example, cycloolef in polymer or the like may be used. The prism main body 10s is an integrally molded component, however, the prism 10 may be divided into the first prism part 11 and the second prism part 12 for consideration. The first prism part 11 enables guidance and output of image light GL and enables seeing through of outside world light HL. The second prism part 12 enables entrance and guidance of the image light GL.

In the first prism part 11, the first surface S11 functions as a refracting surface that outputs the image light GL to the outside of the first prism part 11 and functions as a total reflection surface that totally reflects the image light GL at the inner surface side. The first surface S11 is provided in front of the eye EY and forms a recessed shape with respect to the observer. Note that the first surface S11 is the surface formed by a hard coating layer 27 produced on the surface of the prism main body 10s.

The second surface S12 is a surface of the prism main body 10s and a half-mirror layer 15 is attached to the surface. The half-mirror layer 15 is a reflection film having light transmissivity (i.e., a semi-transmissive reflection film). The half-mirror layer (semi-transmissive reflection film) 15 is formed not on the entire second surface S12, but on a partial area PA formed by narrowing the second surface S12 mainly with respect to the vertical direction along the Y-axis. The half-mirror layer 15 is formed by deposition of a metal reflection film or a dielectric multilayer film on the partial area PA of the foundation surface of the prism main body 10s. The reflectance of the half-mirror layer 15 for the image light GL is set to from 10% to 50% in the assumed incident angle range of the image light GL in view of facilitation of the see-through observation of the outside world light HL. The reflectance of the half-mirror layer 15 for the image light GL of a specific example is set to 20%, for example, and the transmittance for the image light GL is set to 80%, for example.

The third surface S13 functions as a total reflection surface that totally reflects the image light GL at the inner surface side. The third surface S13 is provided in front of the eye EY and forms a recessed shape for the observer like the first surface S11, and, when the outside world light HL passing through the first surface S11 and the third surface S13 is seen, the visibility is substantially zero. Note that the third surface S13 is a surface formed by a hard coating layer 27 produced on the surface of the prism main body 10s.

In the second prism part 12, the fourth surface S14 functions as a total reflection surface that totally reflects the image light GL at the inner surface side. The fourth surface S14 is a surface formed by the hard coating layer 27 produced on the surface of the prism main body 10s.

In the second prism part 12, the fifth surface S15 is formed by deposition of a light reflection film RM formed using an inorganic material on the surface of the prism main body 10s as described above, and functions as a reflection surface.

The sixth surface S16 functions as a refracting surface that allows the image light GL to enter the second prism part 12. Note that the sixth surface S16 is a surface formed by the hard coating layer 27 produced on the surface of the prism main body 10s.

The light-transmissive member 50 forms one light guide part 20 integrally fixed with the prism 10 as described above. The light-transmissive member 50 is a member that assists the see-through function of the prism 10 (auxiliary prism), and has a first transmission surface S51, a second transmission surface S52, and a third transmission surface S53 as side surfaces having optical functions. Here, the second transmission surface S52 is provided between the first transmission surface S51 and the third transmission surface S53. The first transmission surface S51 is provided on a curved surface as an extension of the first surface S11 of the prism 10, the second transmission surface S52 is a curved surface bonded to and integrated with the second surface S12 by a bonding layer CC, and the third transmission surface S53 is provided on a curved surface as an extension of the third surface S13 of the prism 10. Among them, the second transmission surface S52 and the second surface S12 of the prism 10 are integrated by the bonding via the thin bonding layer CC, and have shapes with substantially the same curvature.

The light-transmissive member (auxiliary prism) 50 exhibits high light transmissivity in a visible range, and the main body part of the light-transmissive member 50 is formed using a thermoplastic resin material having substantially the same refractive index as that of the prism main body 10s of the prism 10. Note that the light-transmissive member 50 is formed by bonding the main body part to the prism main body 10s of the prism 10, and then, performing deposition of hard coating in the bonded state with the prism main body 10s. That is, the light-transmissive member 50 has the hard coating layer 27 produced on the surface of the main body part like the prism 10. That is, the first transmission surface S51 and the third transmission surface S53 are formed by the hard coating layer 27 produced on the surface of the main body part.

The image display device 80 has an illumination unit 81 that outputs two-dimensional illumination light SL, an image display element 82 as a transmissive spatial modulator, and a drive control unit 84 that controls the operations of the illumination unit 81 and the image display element 82.

The illumination unit 81 of the image display device 80 has a light source 81a that generates light including three colors of red, green, blue, and a backlight guide part 81b that diffuses the light from the light source 81a into luminous flux having a rectangular section. The image display element 82 is an image element formed by a liquid crystal display device, for example, and forms image light to be displayed such as a moving image by spatial modulation of the illumination light SL from the illumination unit 81. The drive control unit 84 includes a light source drive circuit 84a and a liquid crystal drive circuit 84b. The light source drive circuit 84a supplies power to the light source 81a of the illumination unit 81 to output the illumination light SL with stable brightness. The liquid crystal drive circuit 84b outputs an image signal or a drive signal to the image display element (image element) 82, and thereby, forms color image lights representing moving images and still images as a transmittance pattern. Note that an image processing function may be provided to the liquid crystal drive circuit 84b, or the image processing function may be provided to an external control circuit.

As below, the optical path of the image light GL etc. in the virtual image display device 100 will be explained. The image light GL output from the image display element (image element) 82 enters the sixth surface S16 having the higher positive refracting power provided on the prism 10 while being focused by the projection lens 30.

The image light GL that has passed through sixth surface S16 of the prism 10 travels while being focused and, when passing through the second prism part 12, is reflected by the fifth surface S15 having the lower positive refracting power and reflected by the fourth surface S14 having the lower negative refracting power.

The image light GL that has been reflected by the fourth surface S14 of the second prism part 12 enters the third surface S13 having the lower positive refracting power and is totally reflected and enters the first surface S11 having the lower negative refracting power and is totally reflected in the first prism part 11. Note that the image light GL forms an intermediate image in the prism 10 before and after the light passes through the third surface S13. The image plane II of the intermediate image corresponds to an image plane OI of the image display element 82.

The image light GL totally reflected by the first surface S11 enters the second surface S12, and, specifically, the image light GL entering the half-mirror layer 15 is partially reflected while being partially transmitted through the half-mirror layer 15, and enters and passes through the first surface S11 again. Note that the half-mirror layer 15 acts as a layer having the higher positive refracting power for the image light GL reflected here. Further, the first surface S11 acts as a surface having the negative refracting power for the image light GL passing the surface.

The image light GL that has passed through the first surface S11 enters the pupil of the eye EY of the observer as nearly parallel luminous flux. That is, the observer observes the image formed on the image display element (image element) 82 by the image light GL as a virtual image.

On the other hand, of the outside world lights HL, the light entering nearer the −X side than the second surface S12 of the prism 10 passes through the third surface S13 and the first surface S11 of the first prism part 11, and, concurrently, the positive and negative refracting powers are cancelled out and aberration is corrected. That is, the observer observes an outside world image with less torsion through the prism 10. Similarly, of the outside world lights HL, regarding the light entering nearer the +X side than the second surface S12 of the prism 10, i.e., entering the light-transmissive member 50, when the light passes through the third transmission surface S53 and the first transmission surface S51 provided in the member, the positive and negative refracting powers are cancelled out and the aberration is corrected. That is, the observer observes an outside world image with less torsion through the light-transmissive member 50. Further, of the outside world lights HL, regarding the light entering the light-transmissive member 50 corresponding to the second surface S12 of the prism 10, when the light passes through the third transmission surface S53 and the first surface S11, the positive and negative refracting powers are cancelled out and the aberration is corrected. That is, the observer observes an outside world image with less torsion through the light-transmissive member 50. Note that both the second surface S12 of the prism 10 and the second transmission surface S52 of the light-transmissive member 50 have substantially the same curved surface shapes, and have substantially the same refractive indices, and the gap between them is filled with the bonding layer CC having substantially the same refractive index. That is, the second surface S12 of the prism 10 and the second transmission surface S52 of the light-transmissive member 50 do not act as refracting surfaces for the outside world lights HL.

In this regard, however, the outside world light HL entering the half-mirror layer 15 is partially reflected while being partially transmitted through the half-mirror layer 15, and thus, the outside world light HL from the direction corresponding to the half-mirror layer 15 is weakened by the transmittance of the half-mirror layer 15. On the other hand, the image light GL enters from the direction corresponding to the half-mirror layer 15, and the observer observes the outside world image with the image formed on the image display element (image element) 82 in the direction of the half-mirror layer 15.

Of the image lights GL propagated within the prism 10 and entering the second surface S12, the light not reflected by the half-mirror layer 15 enters the light-transmissive member 50 and is prevented from returning to the prism 10 by an anti-reflection part (not shown) provided in the light-transmissive member 50. That is, the image light GL passing through the second surface S12 is prevented from being returned to the optical path and becoming stray light. Further, the outside world light HL entering from the light-transmissive member 50 side and reflected by the half-mirror layer 15 is returned to the light-transmissive member 50, and is prevented from being output to the prism 10 by the above described anti-reflection part (not shown) provided in the light-transmissive member 50. That is, the outside world light HL reflected by the half-mirror layer 15 is prevented from being returned to the optical path and becoming stray light.

As clearly known from the above explanation, according to the virtual image display device 100 of the first embodiment, the displacement of the optical members 101a, 101b with the limiting parts 107n partially fixed to the frame unit 102 is limited, and excessive stress applied on the optical members 101a, 101b and deformation of the optical members 101a, 101b may be prevented. That is, the support strength of the optical members 101a, 101b may be improved by supplementarily using the limiting parts 107n. Note that the optical members 101a, 101b are partially fixed to the frame unit 102, and the fastening parts and the number of parts are reduced and downsizing becomes easier and the reduction in weight of the virtual image display device 100 is easier. Further, the optical members 101a, 101b are partially fixed to the frame unit 102, and thus, even when there is a difference in coefficient of thermal expansion between the optical members 101a, 101b and the frame unit 102, the expansion or the like of the optical members 101a, 101b with respect to the frame unit 102 is allowed and distortion, deformation, breakage of the optical members may be prevented more reliably.

Second Embodiment

As below, a virtual image display device of the second embodiment will be explained. Note that the virtual image display device of the embodiment is a modified example of the virtual image display device 100 of the first embodiment, and similar to the virtual image display device 100 shown in FIG. 1 etc. without specific explanation.

Figure 9A:
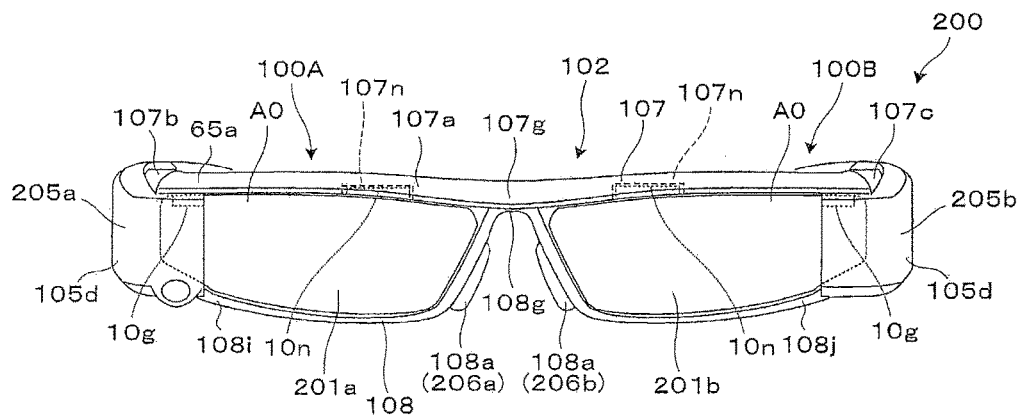
FIG. 9A is a front view for explanation of a virtual image display device as a second embodiment of the invention.
Figure 9B:
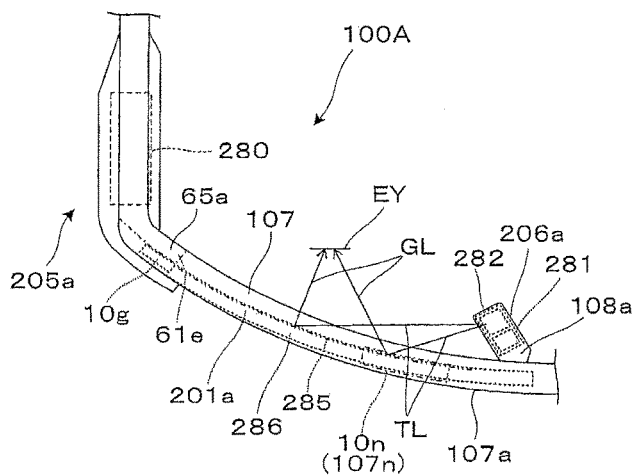
FIG. 9B is a plan view for explanation of a structure of the first display unit of the virtual image display device.

As below, the virtual image display device 200 of the embodiment will be explained with reference to FIGS. 9A and 9B. As shown in the drawings, the virtual image display device 200 of the embodiment includes first and second optical members 201a, 201b that cover the front of the observer's eyes for seeing through, a frame 107 that supports both of the optical members 201a, 201b, first and second drive parts 205a, 205b that are fixed to the parts from both ends on the right and the left to the rear side of the frame 107, and first and second image elements 206a, 206b that output signal lights for two-dimensionally scanning. A first display unit 100A with a combination of the first optical member 201a, the first drive part 205a, and the first image element 206a on the left side of the drawing is a section for forming a virtual image for right eye and the single unit functions as a virtual image display device. Further, a second display unit 100B with a combination of the second optical member 201b, the second drive part 205b, and the second image element 206b on the right side in the drawing is a section for forming a virtual image for left eye, and is formed only symmetric reversal of the first display unit 100A and has the same function as that of the first display unit 100A.

In the first display unit 100A, the first image element 206a forms an intensity-modulated signal light and outputs the signal light as a scanning light TL. The first optical member 201a is an irradiated member that reflects the scanning light TL from the first image element 206a and forms an image light GL, and has a function of guiding the image light GL to the eye EY. The first drive part 205a has a main body part 280 including a light source that supplies illumination light to the first image element 206a via an optical fiber or the like (not shown), a control circuit for the operation thereof, etc.

The first image element 206a is incorporated in a nose contact member 108a and indirectly fixed to the frame 107. The first image element 206a has a signal light modulation part 281 that modulates the illumination light from the main body part 280 based on a control signal, and a scanning system 282 that outputs the signal light through the signal light modulation part 281 while scanning. Here, the scanning system 282 includes an MEMS mirror etc., and performs two-dimensional scanning of longitudinally and laterally changing the output angle of the light to the inner surface of the first optical member 201a by changing the attitude in synchronization with the modulation of the signal light by the signal light modulation part 281 to adjust the optical path of the signal light.

The first optical member 201a is provided to cover the front of the eye EY of the wearer in the front or the light-exiting direction of the first image element 206a. The first optical member 201a has a semi-transmissive reflection film 285 as a semi-transmissive film that is irradiated with the scanning light, and a supporting member 286 that supports and fixes the semi-transmissive reflection film 285. Thereby, not only the virtual image but also lights from the outside world enter the eye EY of the wearer, and the virtual image display device 200 has a see-through configuration that enables observation by superimposition. Note that the semi-transmissive reflection film 285 may be a half-mirror or a diffraction optical element of hologram or the like.

The first optical member 201a is not a light guide part for internal propagation like the first optical member 101a of the first embodiment, but has a thin oval shape that covers the front of the eye and has an attachment part 10g and a rib 10n in a peripheral part A0 as a part of the outer periphery like that of the first embodiment. Note that the frame 107 has second fixing parts 61e and the ribs 10n.

The assembly of the first optical member 201a to the frame 107 will be explained. The first optical member 201a is directly fixed to the second fixing part 61e provided on a side end part 65a at the side of the frame 107 using the projecting attachment part 10g formed in the peripheral part A0, and aligned with respect to the first image element 206a etc. A limiting part 107n having a groove shape is provided as a stopper on the frame 107. After the assembly of the first optical member 201a, the projecting rib 10n provided in the upper end part of the first optical member 201a is inserted into the limiting part 107n in a loose-fit condition with a slight gap. Thereby, displacement at the end side of the first optical member 201a may be limited with respect to the depth direction of the frame 107. Note that the parts of the first optical member 201a except the attachment part 10g are slightly apart from the frame 107 and a protector 108 in a non-fixed state in a relation with the frame 107 and the protector 108.

As below, an operation of image formation will be explained. First, of the first image element 206a, the signal light modulation part 281 forms and outputs a signal light by modulation of illumination light in response to brightness of pixels forming an image. The signal light output from the signal light modulation part 281 enters the scanning system 282 as a scanning part. The scanning system 282 outputs the signal light as the scanning light TL toward the first optical member 201a. In the first optical member 201a, the scanning light TL is allowed to enter and an image light GL as a reflection light forms a virtual image, the virtual image is captured by the observer with the eye EY, and thereby, the image is recognized.

The invention has been explained according to the embodiment, and the invention is not limited to the embodiments, but may be implemented in various forms without departing from the scope of the invention. For example, the following modifications may be made.

In the above described first embodiment, the frame 107 and the projection lens 30 are separated and the projection lens 30 is fixed to the frame 107 by the screw, however, the lens tube 39 of the projection lens 30 may be integrally molded with the frame 107. Methods of integrally molding the lens tube 39 with the frame 107 include outsert molding and machining of the lens tube after die-casting integral molding.

The light guide parts 20 or the projection lenses 30 may be fixed to the frame 107 according to various methods not limited to fastening by screws.

In the above explanation, the limiting part 107n and the rib 10n have the elongated shapes, however, they may be made shorter and a plurality of sets of the limiting parts 107n and the ribs 10n may be provided. Further, when the wide portions 10q are not necessary in the rib 10n and the wide portions 10q are omitted, the wide portions 107q may be omitted in the groove 107s of the limiting part 107n. Furthermore, the limiting part 107n may have a shape not limited to the concave part like the groove 107s, but projections or protrusions alternately provided along the rib 10n, for example.

In the above explanation, the limiting part 107n is provided on the frame 107, however, in place of or with that, a limiting part for preventing distortion, wobbling, or the like of the prism 10 may be provided in the protector 108. The limiting part provided at the protector 108 side locks the lower rib 10o in loose fit, for example.

In the above explanation, the protectors 108 are attached to the frame 107, however, the protectors 108 may be omitted. In this case, the frame 107 shown in FIG. 2B etc. may be maintained in the original shape and an auxiliary member provided with the nose contact members 108a may be connected to the center part 107g of the frame 107, however, a frame 107 having an auxiliary member integrally provided may be prepared in advance. The auxiliary member may be used as a member for protecting the light guide parts 20 like the longitudinal parts 63a of the protectors 108. Note that the frame 107 and the protectors 108 may be integrally fabricated.

In the above described first embodiment, the projection lens 30 is provided at the light-incident side of the prism 10, however, the projection lens 30 may be omitted and an imaging function may be provided to the prism 10 itself. Or, another prism 10 having an imaging function may be provided in place of the projection lens 30.

In the above described first embodiment, the locking member 39a with the light guide part 20 is provided in the lens tube 39 of the projection lens 30, however, a locking member that is fitted with the lens tube 39 to pinch the lens tube 39 may be provided at the light guide part 20 side, for example.

In the above described first embodiment, the half-mirror layer (semi-transmissive reflection film) 15 is formed in the horizontally long rectangular region, however, the outline of the half-mirror layer 15 may be appropriately changed in response to the application or other usage. Further, the transmittance and the reflectance of the half-mirror layer 15 may be changed in response to the application or the like.

In the above described first embodiment, the half-mirror layer 15 is just the semi-transmissive film (e.g., a metal reflection film or a dielectric multilayer film), however, the half-mirror layer 15 may be replaced by a flat or curved hologram element.

In the above described first embodiment, the distribution of display brightness in the image display element 82 is not particularly adjusted, however, in the case where a brightness difference is produced depending on the position or the like, the distribution of display brightness may be adjusted non-uniformly.

In the above described first embodiment, as the image display device 80, the image display element 82 including the transmissive liquid crystal display device or the like is used, however, not limited to the image display element 82 including the transmissive liquid crystal display device, but various devices may be used for the image display device 80. For example, a configuration using a reflective liquid crystal display device may be employed or a digital micromirror device or the like may be used in place of the image display element 82 including the transmissive liquid crystal display device or the like. Further, a self-emitting element represented by an LED array or an OLED (organic EL) may be used as the image display device 80.

In the above described first embodiment, the image display device 80 including the transmissive liquid crystal display device or the like is used, however, a scanning image display device may be used instead.

Figure 10:
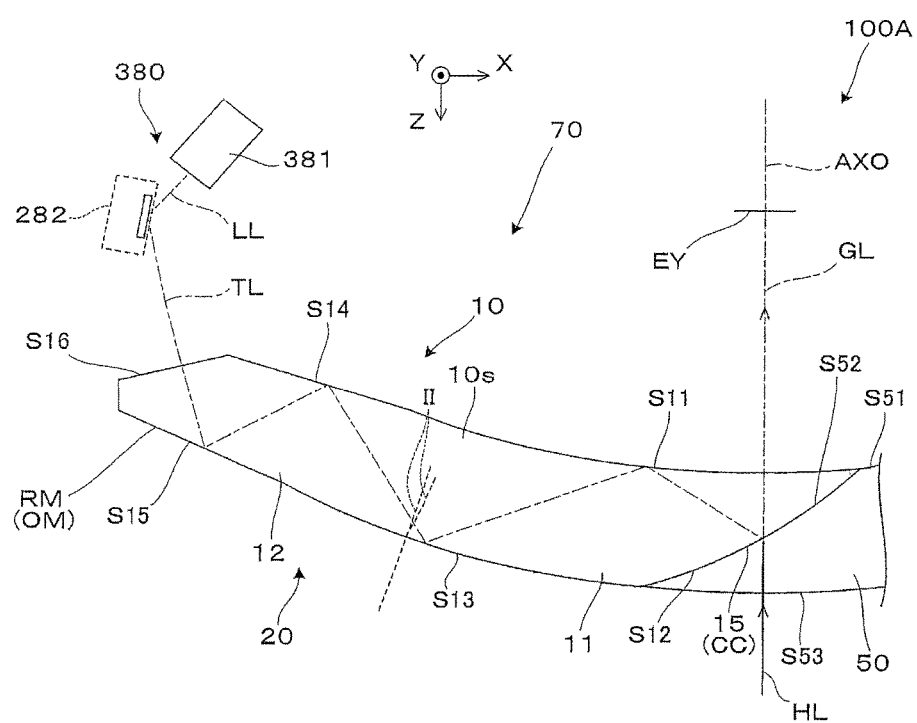
FIG. 10 is a diagram for explanation of a virtual image display device of a modified example.

Specifically, as shown in FIG. 10, the first display unit 100A as a virtual display device includes a light guide part 20 and an image display device 380. The light guide part 20 is the same as that explained in the first embodiment and the explanation is omitted here. On the other hand, the image display device 380 corresponds to the first image element 206a in the second embodiment, and has a signal light forming part 381 and a scanning system 282. The signal light forming part 381 also includes a light source and forms and outputs a signal light LL. The scanning system 282 adjusts the optical path by changing the attitude according to the modulation of the signal light forming part 381, and thereby, a scanning light TL to be an image light GL is allowed to enter the light guide part 20, and the entire partial region of the second surface S12 in which the half-mirror layer 15 is formed is scanned. In the explanation of the operation of the illustrated first display unit 100A, of the image display device 380, the signal light LL output from a signal light forming part GG enters the scanning system 282. The scanning system 282 outputs the signal light LL as the scanning light TL toward the light guide part 20. The light guide part 20 guides the scanning light TL inside by total reflection or the like to the half-mirror layer 15. In this regard, the surface of the half-mirror layer 15 is scanned with the scanning light TL, and thereby, a virtual image is formed by an image light GL as a trajectory of the scanning light TL, the virtual image is captured by the observer with the eye EY, and the image is recognized. Note that, in the illustrated case, the sixth surface S16 as the light-incident surface of the light guide part 20 is a flat surface perpendicular to the optical axis of the scanning light TL. Further, the fifth surface S15 and the fourth surface S14 are flat surfaces.

In the above explanation, the virtual image display device 100 including the pair of display units 100A, 100B is explained, however, a single display unit may be employed. That is, one set of the projection see-through device 70 and the image display device 80 are not provided for both the right eye and the left eye, but the projection see-through device 70 and the image display device 80 may be provided for only one of the right eye and the left eye for seeing an image with one eye. In this case, the frame 107 and the temple parts 104 have shapes symmetrically provided as shown in FIG. 1 etc., for example.

In the above explanation, the distance between the pair of display units 100A, 100B in the X-direction is not explained, however, the distance between the display units 100A, 100B is not limited to a fixed distance, but the distance may be adjusted by a mechanical mechanism or the like. That is, if an expansion and contraction mechanism or the like is provided in the frame 107, the distance between the display units 100A, 100B in the X-direction may be adjusted in response to the distance between eyes of a wearer of the like.

In the above described first embodiment, the image light is guided by total reflection on the interface with the air on the first surface S11 and the third surface S13 of the prism 10 without a mirror or a half-mirror on the surfaces, however, the total reflection in the virtual image display device 100 according to the invention includes reflection by a mirror coating or a half-mirror film formed on the entire or a part of the first surface S11 or the third surface S13. For example, the total reflection includes the case where the incident angle of the image light satisfies the total reflection condition and a mirror coating, or the like is produced on the entire or a part of the first surface S11 or the third surface S13 and substantially all image lights are reflected. Further, as long as an image light with sufficient brightness may be obtained, the entire or a part of the first surface S11 or the third surface S13 may be coated with a mirror having some transmittance.

In the above explanation, the prisms 10 etc. extend in the lateral directions in which the eyes EY are arranged, however, the prisms 10 may be provided to extend in the longitudinal directions. In this case, the prisms 10 are supported by cantilever in the upper part, for example.

The entire disclosure of Japanese Patent Application No. 2013-029732, filed Feb. 19, 2013 is expressly incorporated by reference herein.

What is claimed is:
1. A virtual image display device comprising:
an image element;
an optical member that directs a light from the image element toward an eye of an observer for visual recognition of an image,
the optical member having a light guide part that guides an image light from an image display element as the image element to the eye of the observer while reflecting the light inside; and
a frame unit that supports the image element and the optical member so that the optical member may be placed in front of the eye of the observer, wherein
the frame unit has a limiting part that mechanically limits displacement of the optical member partially fixed to the frame unit,
the frame unit has a fixing part that is connected to the light guide part to directly fix the light guide part to the frame unit, the light guide part being fixed to the fixing part using an attachment part of the light guide part,
all other parts of the light guide part, except the attachment part, are not fixed to the frame unit,
the optical member has a lock part locked by the limiting part,
the lock part is locked by the limiting part using engagement of a concave portion and a convex portion, and
the lock part has a rib linearly extending along a peripheral part of the optical member, and the limiting part has a groove that is provided to be sandwiched by a pair of the protrusion parts and receives the rib.

2. The virtual image display device according to claim 1, wherein the limiting part is placed adjacent to the optical member in a position to which the optical member is displaced and blocks the displacement of the optical member.

3. The virtual image display device according to claim 2, wherein the optical member has an oval outline, and the limiting part has a protrusion part that limits the displacement in a direction perpendicular to a surface in which the optical member extends while allowing the displacement in a longitudinal direction of the optical member.

4. The virtual image display device according to claim 1, wherein the frame unit is formed using a metal material and the optical member is formed using a resin material.

5. The virtual image display device according to claim 1, wherein the limiting part is in elastic contact with the optical member.

6. The virtual image display device according to claim 1, wherein the limiting part further has an elastic member provided in a gap between the rib and the concave portion.

7. The virtual image display device according to claim 1, wherein the fixing part and the limiting part are provided apart from each other.

8. The virtual image display device according to claim 1, wherein the frame unit has a frame with the fixing part and a protector that is fixed to the frame and protects at least a part of the peripheral part of the optical member.

9. The virtual image display device according to claim 8, wherein the limiting part is provided at a center side along the frame and the fixing part that fixes the light guide part to the frame unit is provided at a side of the frame.

10. The virtual image display device according to claim 1, wherein the light guide part has a prism that enables see-through observation of an outside world light while guiding the image light and a light-transmissive member that is connected to the prism and assists a see-through function of the outside world light.

11. The virtual image display device according to claim 1, wherein the image element outputs a signal light for two-dimensional scanning and the optical member reflects the light from the image display element and guides the light to the eye of the observer.

12. The virtual image display device according to claim 1, wherein a surface of the fixing part and a surface of the attachment part are brought into contact such that detachable fixation is achieved.

* * * * *